United States Patent [19]

Haapala

[11] 4,359,104
[45] Nov. 16, 1982

[54] FURROW OPENING, CLOSING AND SOIL FIRMING DEVICE FOR SEED PLANTING

[76] Inventor: Ray Haapala, Rte. 3, Box 76, Dassell, Minn. 55324

[21] Appl. No.: 256,535

[22] Filed: Apr. 22, 1981

[51] Int. Cl.³ ............................................... A01B 1/20
[52] U.S. Cl. ........................... 172/372; 111/82; 172/375; 172/381
[58] Field of Search ............... 172/176, 360, 371, 372, 172/375, 381, 701, 721, 727, 765, 768, 770, 771; 111/82, 85, 86; D8/7

[56] References Cited

U.S. PATENT DOCUMENTS

| D. 221,727 | 9/1971 | Erickson | D8/7 |
|---|---|---|---|
| 591,710 | 10/1897 | Wernicke | 172/360 |
| 740,091 | 9/1903 | Cole | 111/86 |
| 859,869 | 7/1907 | Brown | 111/86 UX |
| 1,611,011 | 12/1926 | Ferguson | 111/86 X |
| 1,689,866 | 10/1928 | Erickson | 111/82 |
| 1,715,616 | 6/1929 | Overholt et al. | 172/701 |
| 2,089,245 | 8/1937 | Barron | 172/372 |
| 2,242,025 | 5/1941 | Ewerth | 172/721 |
| 2,251,048 | 7/1941 | Garland | 172/372 |
| 2,291,144 | 7/1942 | Brownsey | 172/372 |
| 4,319,644 | 3/1982 | Young | 172/375 |

FOREIGN PATENT DOCUMENTS

| 325976 | 9/1920 | Fed. Rep. of Germany | 111/85 |
|---|---|---|---|
| 72621 | 10/1947 | Norway | 172/768 |

Primary Examiner—Richard T. Stouffer
Attorney, Agent, or Firm—Littlepage & Webner

[57] ABSTRACT

A plate has on its under side a V-shape keel of decreasing depth from end-to-end, a handle mounting on its upper side, and upwardly flared soil flattener at the ends of the plate.

1 Claim, 6 Drawing Figures

FURROW OPENING, CLOSING AND SOIL FIRMING DEVICE FOR SEED PLANTING

FIELD OF INVENTION

Earth Working; Guided by Walking Attendant; Hand Tool, Channel Type in Class 172, Subclass 377.

PRIOR ART

U.S. Pat. Nos.: Winn 1,023,701; James 1,179,726; Pruett 1,341,196; Brannin 3,942,591; U.S. Design Patents: Schumacher D182,385; Bruneau D 192,868; Odell D 211,747.

OBJECTS

When planting seeds, gardeners, after loosening the soil, oftentimes form a furrow either with a stick or a hoe handle or with a corner of a hoe blade. Then, after dropping seeds in the furrow, they most likely will scrape or rake soil back on top of the seeds and firm the soil down by walking along the row. The problem arises from the criticality of furrow depth and the depth of the soil covering over the seeds. Some seeds, like tomatoes or lettuce seeds, should be planted in shallow furrows with only about ⅛ of an inch of soil firmed over them. Other seeds, like beans, should be planted deep, about 2½ inches. An inexperienced gardener generally finds it very difficult to judge and maintain these depths, the results being that some of the planted seeds grow into plants and many do not. The object now is to provide a simple manually operated tool which, with very little practice, can be manipulated in one mode to form a furrow of desired depth, be it shallow or deep, and in another mode to cover over the furrow and pack down the otherwise loose dirt over the seeds into the furrow.

These and other objects will be apparent from the following specifications and drawing, in which:

DESCRIPTION OF THE DRAWING FIGURES

Figure 1:
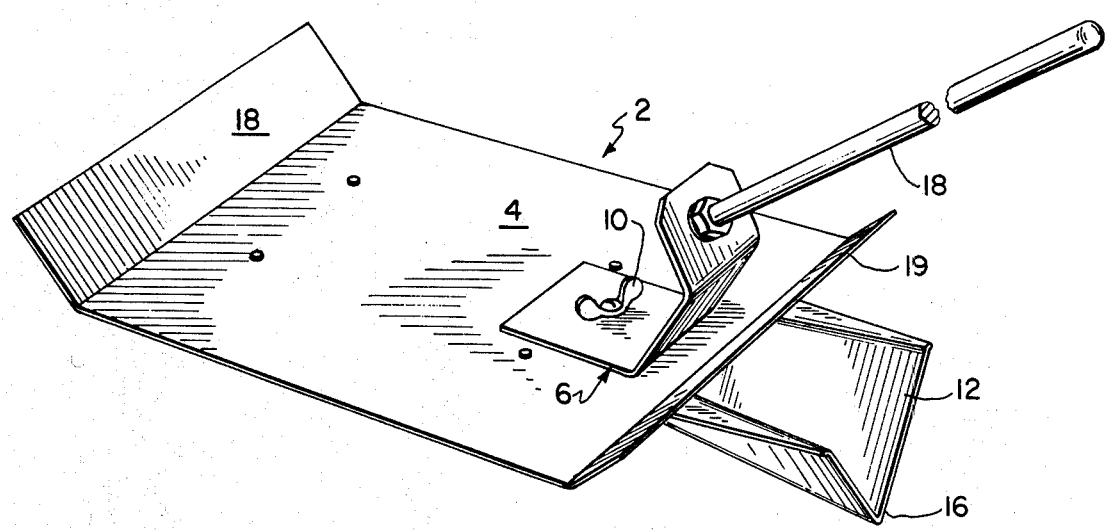
FIG. 1 is a prospective view of the furrow opening and closing device showing the handle oriented for furrow opening.
Figure 2:
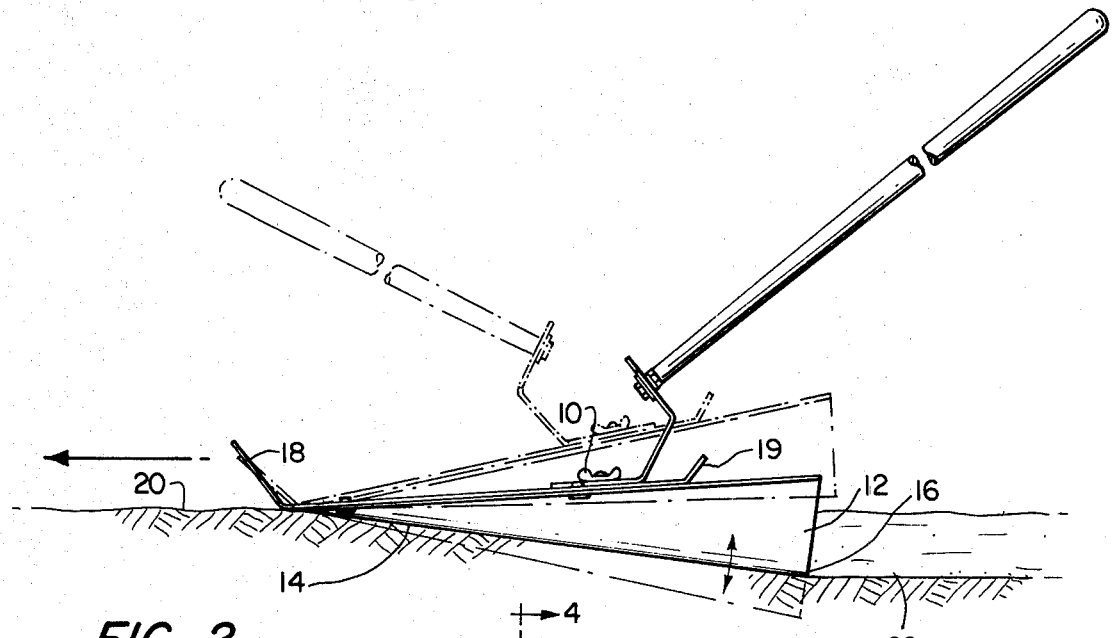
FIG. 2 is a side elevation showing the furrow-opening action of the device when the device is operated as shown in full-lines, and showing the furrow-closing action of the device when the device is operated as shown in dash lines.
Figure 3:
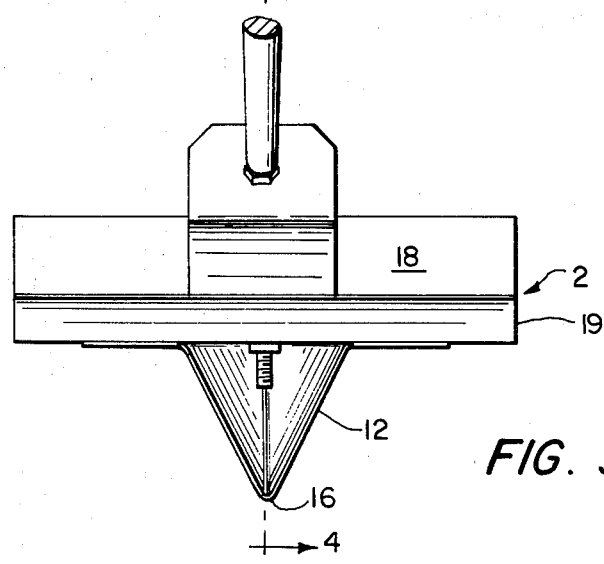
FIG. 3 is a rear elevation of the device.
Figure 4:
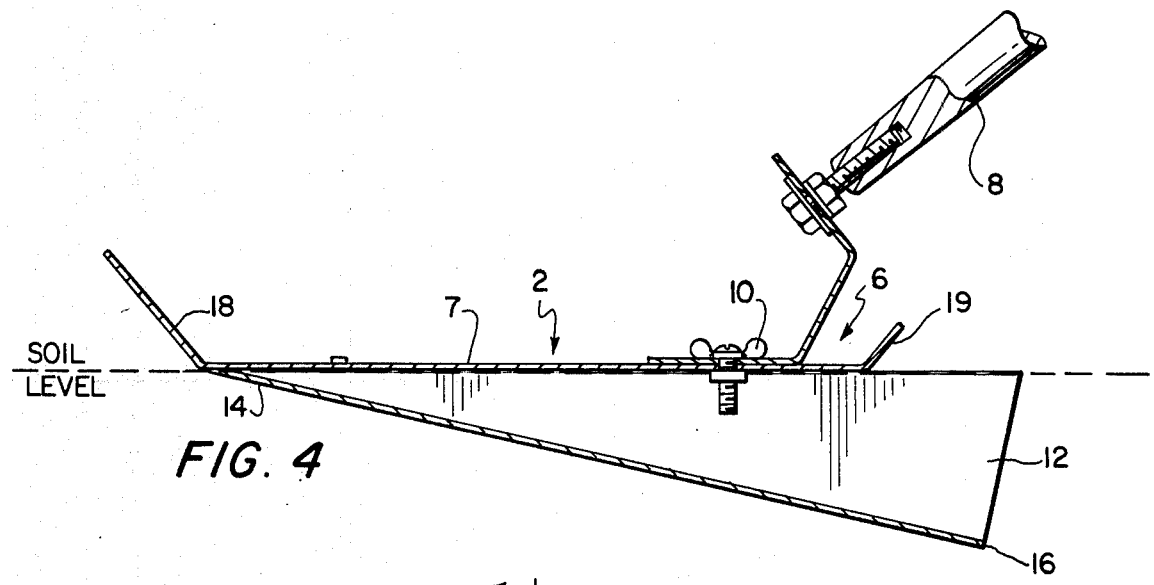
FIG. 4 is a vertical cross section along the lines 4—4 of FIG. 3.
Figure 5:
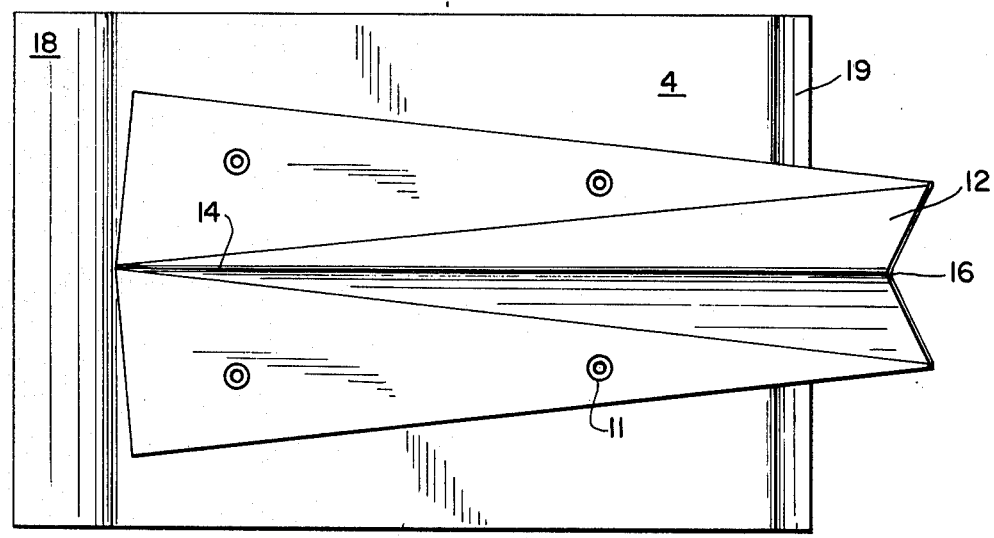
FIG. 5 is a bottom plan view of the device.
Figure 6:
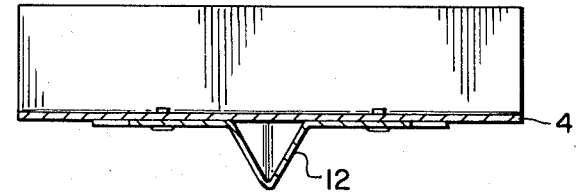
FIG. 6 is a cross section along the lines 6—6 of FIG. 5.

Referring now to the drawing, the furrow opening and covering device 2 comprises a plate 4 on the upper side on which is a mounting 6 for a handle 8. The handle mounting may be reversed by loosening the wing nut 10. Preferably, the handle is disposed at an angle of between 45° and 90° with respect to the plate. Secured, as by rivets, 11 on the underside of plate 4 is a V-shape keel 12 having a shallow end 14 and a deep end 16. The shallow end 14 of the keel merges into the flat underside of the plates. At the end of the plate 4 are upwardly flared flanges 18 and 19.

In operation of the invention, after the soil 20 has been loosened the furrow 22 is formed by dragging or pushing the plate 12 along the ground with the shallow end of the keel foremost. The depth of the furrow is determined by tipping the plate so as to impose the desired keel depth into the soil. This firms the soil at the bottom of the furrow. If a deep furrow is to be formed, the plate is tipped so that the deep end of the keel presses into the loose soil. Varying furrow depths can be formed according to the angle at which the plate is tipped. The upwardly-flared flanges 18 or 19 at the ends of the plate firm and flatten the soil alongside the furrow. After the furrow is formed, seeds are dropped along it and then the seeds are covered and the furrow is closed by reversing the tool and cooking it up so that the deep end 16 of the keel, then foremost, is lifted upwardly above the bottom of the furrow and the remainder of the keel slides along in the furrow. As the tool thus moves along the flat bottom part of the plate pushes the soil into the furrow until finally, where the shallow end of the keel has merged into the flat of the plate, the soil completely fills the furrow.

I claim:

1. A furrowing tool comprising flat generally rectangular plate having top and bottom sides and having first and second opposite ends, said first end having an integral upwardly-flared flange extending thereacross an elongate keel on the bottom side of the plate, the length of said keel extending in the end-to-end direction of the plate, said keel being substantially V-shape in cross-section with the maximum width of the V thereof being substantially less than the width of the plate, said keel varying in depth from end-to-end, and having one end relatively deep and an opposite end substantially merging with the flat bottom side of the plate adjacent the first end thereof, the other end of the keel extending rearwardly beyond the second end of the plate, an elongate handle and a handle mounting on the top side of the plate, said handle mounting being reversible between one position in which the handle angles upwardly and towards the second end of the plate and a second position in which the handle angles upwardly and towards the first end of the plate.

* * * * *

UNITED STATES PATENT AND TRADEMARK OFFICE
CERTIFICATE OF CORRECTION

PATENT NO. : 4,359,104

DATED : November 16, 1982

INVENTOR(S) : Ray Haapala

It is certified that error appears in the above—identified patent and that said Letters Patent is hereby corrected as shown below:

In column 2, line 24, delete "cooking", insert --cocking--.

Signed and Sealed this

Eighth Day of February 1983

[SEAL]

Attest:

GERALD J. MOSSINGHOFF

Attesting Officer     Commissioner of Patents and Trademarks